US012520043B2

(12) United States Patent
Park et al.

(10) Patent No.: US 12,520,043 B2
(45) Date of Patent: *Jan. 6, 2026

(54) METHOD FOR OPTIMIZING PRIVACY MASK OF CAMERA WITH PANNING AND TILTING CONTROL AND IMAGING DEVICE WITH PRIVACY MASK OPTIMIZATION APPLIED

(71) Applicant: HANWHA TECHWIN CO., LTD., Seongnam-si (KR)

(72) Inventors: Jong In Park, Seongnam-si (KR); Jung Suk Oh, Seongnam-si (KR); Dae Bong Kim, Seongnam-si (KR)

(73) Assignee: HANWHA TECHWIN CO., LTD., Suwon-si (KR)

( * ) Notice: Subject to any disclaimer, the term of this patent is extended or adjusted under 35 U.S.C. 154(b) by 573 days.

This patent is subject to a terminal disclaimer.

(21) Appl. No.: 17/888,950

(22) Filed: Aug. 16, 2022

(65) Prior Publication Data

US 2022/0394182 A1 Dec. 8, 2022

Related U.S. Application Data

(63) Continuation of application No. 17/118,784, filed on Dec. 11, 2020, now Pat. No. 11,418,717, which is a (Continued)

(30) Foreign Application Priority Data

Jun. 12, 2018 (KR) .................. 10-2018-0067567

(51) Int. Cl.
*H04N 23/69* (2023.01)
*G01C 1/00* (2006.01)
(Continued)

(52) U.S. Cl.
CPC ............... *H04N 23/69* (2023.01); *G01C 1/00* (2013.01); *G01C 19/04* (2013.01); *G06T 7/20* (2013.01); *G06T 7/70* (2017.01)

(58) Field of Classification Search
None
See application file for complete search history.

(56) References Cited

U.S. PATENT DOCUMENTS

2012/0120266 A1* 5/2012 Kang .................. H04N 23/635
348/E5.042
2015/0304574 A1* 10/2015 Yanagi .................. H04N 23/66
348/158
(Continued)

FOREIGN PATENT DOCUMENTS

KR 10-0664811 B1 1/2007
KR 10-2007-0048841 A 5/2007
(Continued)

OTHER PUBLICATIONS

International Search Report dated Apr. 24, 2019 issued by the International Searching Authority in counterpart International Application No. PCT/KR2019/000545 (PCT/ISA/210).
(Continued)

*Primary Examiner* — James M Anderson, II
(74) *Attorney, Agent, or Firm* — Sughrue Mion, PLLC

(57) ABSTRACT

A method of creating a privacy mask from an image imaged by an imaging device in which a rotation axis of a camera and a center of a lens do not match includes measuring a distance from the camera to an object in a first imaging condition; creating a first mask for the object, and storing the distance together with the first mask; and creating a second mask for the object in a second imaging condition and correcting a position of the second mask using the first mask and the distance, wherein an imaging angle of the camera in the first imaging condition is same as the imaging angle of
(Continued)

the camera in the second imaging condition, and wherein a position of the lens in the first imaging condition is reversed around the rotation axis from a position of the lens in the second imaging condition.

17 Claims, 11 Drawing Sheets

Related U.S. Application Data continuation of application No. PCT/KR2019/000545, filed on Jul. 14, 2019.

(51) Int. Cl.
*G01C 19/04* (2006.01)
*G06T 7/20* (2017.01)
*G06T 7/70* (2017.01)

(56) References Cited

U.S. PATENT DOCUMENTS

2016/0134801 A1* 5/2016 Ashitani ................ H04N 23/58
    348/211.3
2016/0150188 A1* 5/2016 Ha .......................... H04N 23/69
    348/143

FOREIGN PATENT DOCUMENTS

| KR | 10-2013-0102743 A | 9/2013 |
| KR | 10-2014-0117183 A | 10/2014 |
| KR | 10-2017-0002308 A | 1/2017 |

OTHER PUBLICATIONS

International Written Opinion dated Apr. 24, 2019 issued by the International Searching Authority in counterpart International Application No. PCT/KR2019/000545 (PCT/ISA/237).

* cited by examiner $$\theta = \tan^{-1}(44/d)$$

METHOD FOR OPTIMIZING PRIVACY MASK OF CAMERA WITH PANNING AND TILTING CONTROL AND IMAGING DEVICE WITH PRIVACY MASK OPTIMIZATION APPLIED

CROSS-REFERENCE TO THE RELATED APPLICATION

This is a continuation of U.S. application Ser. No. 17/118,784 filed Dec. 11, 2020, which is a continuation application of International Patent Application No. PCT/KR2019/000545 filed on Jan. 14, 2019, which is based on and claims priority to Korean Patent Application No. 10-2018-0067567, filed on Jun. 12, 2018, in the Korean Intellectual Property Office, the disclosure of which is incorporated by reference herein in its entirety

BACKGROUND

1. Field

The present disclosure relates to a method for generating and positioning a privacy mask, and more specifically, to a method and an apparatus for the same, in which panning or tilting is performed, and a privacy mask is created from an image imaged by an imaging device in which a rotation axis of the imaging unit and a center of a lens do not match and a position thereof is corrected and optimized.

2. Description of Related Art

Recently, as the importance of security is emphasized, the installation of surveillance cameras is becoming popular. The surveillance cameras increase security, but personal information may be leaked, causing a problem of invading privacy. To solve this problem, technologies for applying a privacy mask to an image for personal information are being developed.

In the case of a camera that supports pan/tilt/zoom (PTZ) functions, which may be referred to as a PTZ camera, a mask must be created according to an object depending on a control angle. However, due to a structural feature of the camera or a structural error such as an assembly tolerance, the mask may not be properly applied to the object, and may be out of position and thus masking may not be performed properly. In particular, in the case of a structure in which the center of the camera lens does not coincide with the rotation axis and is asymmetrical, when the mask is exposed to the maximum because an exposed contact of the mask varies depending on a distance between the camera and the object, there is a problem that, inefficiently, a size of the mask must be drawn larger.

SUMMARY

Provided is a method in which panning or tilting is performed, and a privacy mask is created from an image imaged by an imaging device in which a rotation axis of the imaging unit and a center of a lens do not match and a position thereof is corrected.

Also provided is an imaging device in which panning or tilting is performed, and a privacy mask is created from an image imaged by an imaging device in which a rotation axis of the imaging unit and a center of a lens do not match and a position thereof is corrected.

In accordance with an aspect of the disclosure, a method of creating a privacy mask from an image imaged by an imaging device in which a rotation axis of a camera and a center of a lens do not match includes measuring a distance from the camera to an object in a first imaging condition; creating a first mask for the object, and storing the distance together with the first mask; and creating a second mask for the object in a second imaging condition and correcting a position of the second mask using the first mask and the distance, wherein an imaging angle of the camera in the first imaging condition is same as the imaging angle of the camera in the second imaging condition, and wherein a position of the lens in the first imaging condition is reversed around the rotation axis from a position of the lens in the second imaging condition.

The first imaging condition may include a first panning angle and a first tilting angle, and the second imaging condition may include a second panning angle and a second tilting angle.

A difference between the first panning angle and the second panning angle may be 180 degrees, and a sum of the first tilting angle and the second tilting angle may be 180 degrees.

The method may further include calculating an error between the second mask created and the object based on an offset between a center point of the lens and the rotation axis and the distance; and correcting the position of the second mask using the calculated error.

The distance may be measured using a distance measurement unit or using locus data of the lens.

The method may further include initializing the imaging device by correcting a structural error of the imaging device.

The correcting of the structural error may include: rotating a panning motor from 0 degrees to 180 degrees at unit angle intervals; measuring an actual rotation angle of the camera; and comparing and storing a rotation angle of the panning motor and the actual rotation angle of the camera.

The actual rotation angle of the camera may be measured using one or more of a gyro sensor or an acceleration sensor.

Information stored by comparing the rotation angle of the panning motor and the actual rotation angle of the camera may be applied to the actual rotation angle of the camera at 180 to 360 degrees of the panning motor.

The correcting of the second mask may include correcting the position of the second mask using a difference between the rotation angle of the panning motor and the actual rotation angle of the camera.

The correcting of the structural error may include: setting a position of a tilting angle of 0 degrees to a predetermined position; calculating a tilting error angle using a lens position of the lens at a first tilting angle and a lens position of the lens at a second tilting angle; and rotating the position of the tilting angle of 0 degrees by half of the tilting error angle to correct the position of the tilting angle of 0 degrees, wherein an imaging angle of the camera for the second tilting angle is same as an imaging angle of the camera for the first tilting angle, and wherein a position of the lens at the second tilting angle is reversed around the rotation axis from a position of the lens at the first tilting angle.

In accordance with an aspect of the disclosure, an imaging device includes a camera, wherein a rotation axis of the camera and a center of a lens of the camera do not match; a rotation configured to perform panning or tilting by rotating the camera; a memory configured to store instructions for creating a privacy mask in an image imaged by the camera; and at least one processor configured to execute the instructions to: create a first mask for an object in a first imaging condition, store a distance from the camera to the object together with the first mask, and create a second mask for the object in a second imaging condition and correct a position of the second mask using the first mask and the distance, wherein an imaging angle of the camera in the first imaging condition is same as the imaging angle of the camera in the second imaging condition, and wherein a position of the lens in the first imaging condition is reversed around the rotation axis from a position of the lens in the second imaging condition.

The first imaging condition may include a first panning angle and a first tilting angle, the second imaging condition may include a second panning angle and a second tilting angle, a difference between the first panning angle and the second panning angle may be 180 degrees, and a sum of the first tilting angle and the second tilting angle may be 180 degrees.

The at least one processor may be further configured to execute the instructions to: calculate an error between the second mask and the object based on an offset between a center point of the lens and the rotation axis and the distance, and correct the position of the second mask using the calculated error.

The at least one processor may be further configured to execute the instructions to measure the distance using locus data of the lens.

The device may further include a distance measurement device configured to measure the distance to the object.

The at least one processor may be further configured to execute the instructions to initialize the imaging device by correcting a structural error of the imaging device.

The at least one processor may be further configured to execute the instructions to: rotate a panning motor from 0 degrees to 180 degrees at unit angle intervals, measure an actual rotation angle of the camera, and compare a rotation angle of the panning motor and the actual rotation angle of the camera; and store the rotation angle of the panning motor and the actual rotation angle of the camera in the memory.

The device may further include one or more of a gyro sensor or an acceleration sensor configured to measure the actual rotation angle of the camera.

The at least one processor may be further configured to execute the instructions to: set a position of a tilting angle of 0 degrees to a predetermined position, calculate a tilting error angle using a lens position of the lens at a first tilting angle and a lens position of the lens at a second tilting angle, and rotate the position of the tilting angle of 0 degrees by half of the tilting error angle to correct the position of the tilting angle of 0 degrees, wherein an imaging angle of the camera for the second tilting angle is same as an imaging angle of the camera for the first tilting angle, and wherein a position of the lens at the second tilting angle is reversed around the rotation axis from a position of the lens at the first tilting angle.

However, aspects are not restricted to those set forth herein. The above and other aspects will become more apparent to one of ordinary skill in the art to which the disclosure pertains by referencing the detailed description given below.

BRIEF DESCRIPTION OF THE DRAWINGS

The above and other aspects and features of certain embodiments of the present disclosure will become more apparent from the following description taken in conjunction with the accompanying drawings, in which.

DETAILED DESCRIPTION OF THE EMBODIMENTS

Figure 1:
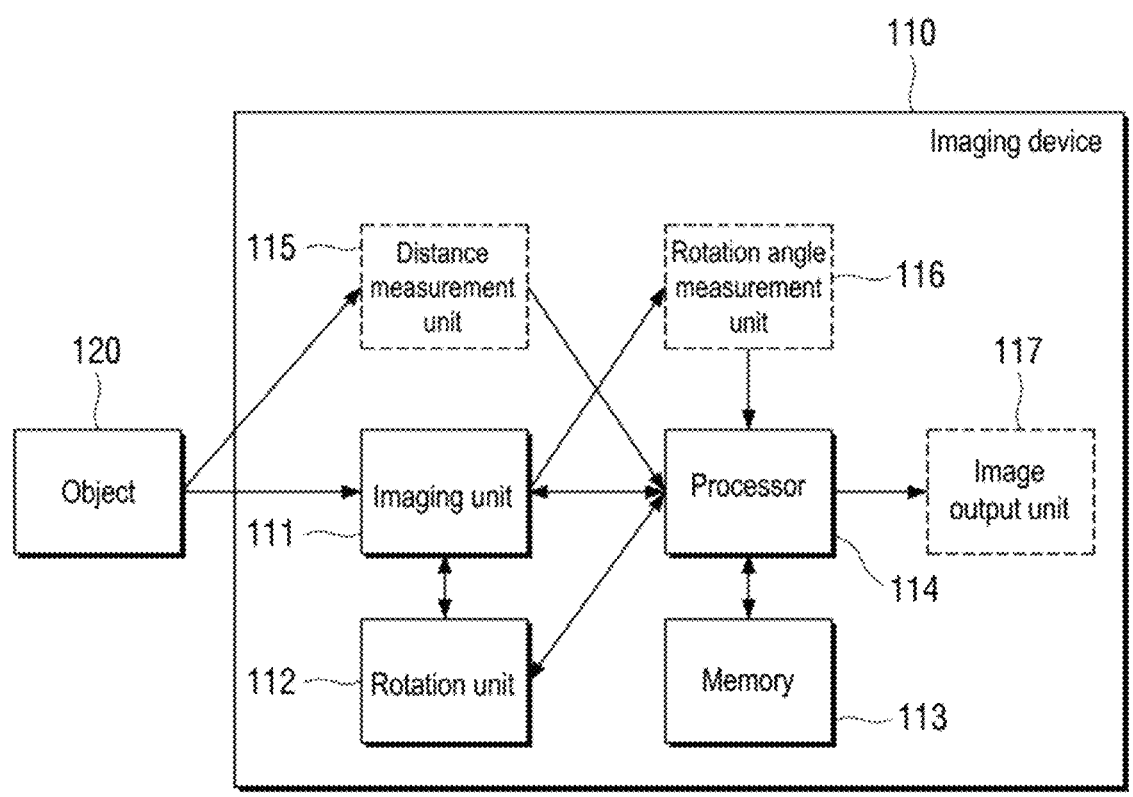
FIG. 1 is a block diagram of an imaging device according to an embodiment.

Advantages and features of the disclosure and methods to achieve them will become apparent from the descriptions of exemplary embodiments herein below with reference to the accompanying drawings. However, the inventive concept is not limited to embodiments disclosed herein but may be implemented in various ways. The exemplary embodiments are provided for making the disclosure thorough and for fully conveying the scope to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

FIG. 1 is a block diagram of an imaging device according to an embodiment.

An imaging device 110 according to an embodiment includes an imaging unit 111, a rotation unit 112, a processor 114, and a memory 113, and may further include a distance measurement unit 115, a rotation angle measurement unit 116, or an image output unit 117. In an embodiment, imaging unit 111 may be for example a camera, or another device which includes an imaging sensor.

In an embodiment, a program for correcting a position of a privacy mask in an image imaged by the imaging unit 111 is stored in at least one memory 113, and a program for correcting the position of the privacy mask stored in the memory 113 is driven by at least one processor 114. An image obtained by correcting the position of the mask may be displayed through the image output unit 117.

The imaging unit 111 images an image by panning or tilting rotation by the rotation of the rotation unit 112. When the imaging unit 111 rotates, a rotation axis and a center of a lens may not match. In addition to the lens for imaging, other components are mounted in front of the imaging unit 111. Depending on the arrangement of the lens and other components, the rotation axis of the imaging unit 111 and the center of the lens may be formed so as not to match. As shown in FIGS. 2A-2C and 3, when a configuration such as IR emitter 320 as well as a lens 310 is arranged in front of the imaging unit 111, the lens 310 may be positioned at a lower portion around the rotation axis 340 of the imaging unit, and the IR emitter 320 may be positioned at an upper portion around the rotation axis 340 of the imaging unit. The IR emitter 320 may adjust an irradiated area according to an angle of view according to zoom of the lens 310. Even if other configurations are mounted, in order to minimize a size of the imaging unit 111 and an area in front of the imaging unit 111, the center 350 of the lens 310 may be formed so as not to coincide with the rotation axis of the imaging unit. For example, the rotation axis of the imaging unit 111 may be a rotation axis in a tilting direction.

The rotation unit 112 rotates the imaging unit 111 to perform panning or tilting. The rotation unit 112 may rotate in two directions to perform the panning and tilting. In an embodiment, the rotation unit 112 may rotate in a third direction orthogonal to the panning and tilting.

Figure 2A:
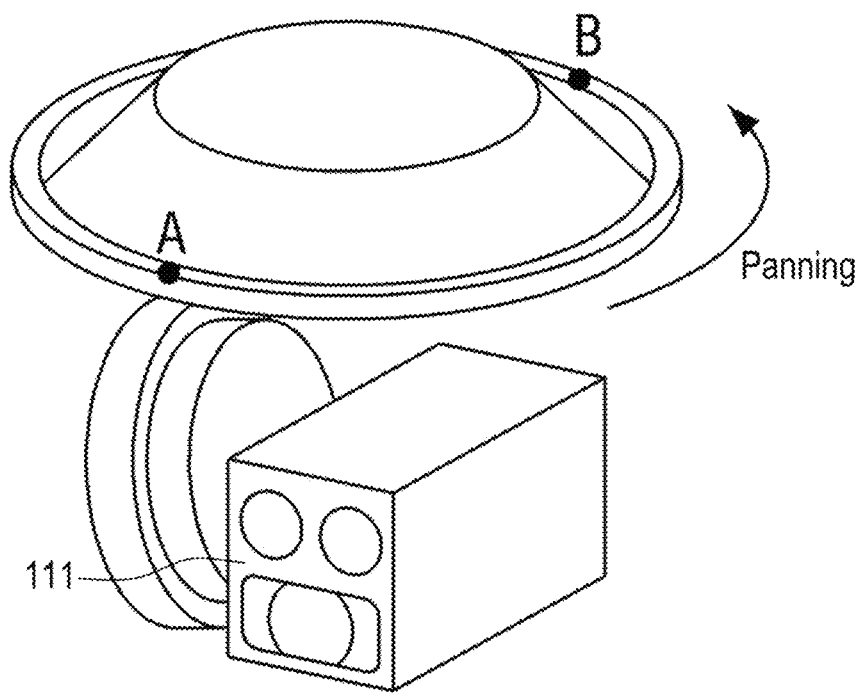
FIGS. 2A-2C, 3, and 4 are diagrams for explaining an error occurring in an imaging device in which a rotation axis and a center of a lens do not match, according to an embodiment.
Figure 2B:
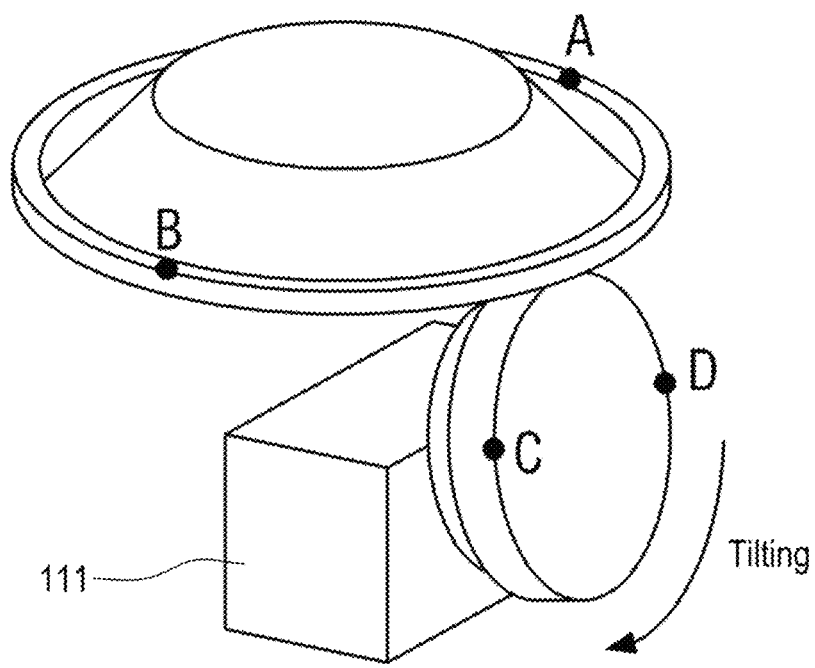
Figure 2C:
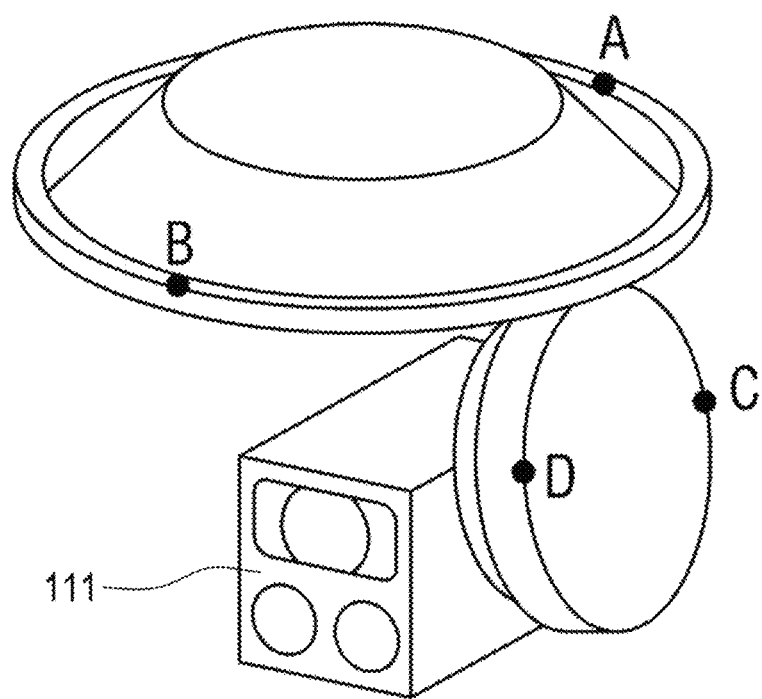

When the panning and tilting of the rotation unit 112 are controlled, two imaging conditions may exist when imaging an object at the same position. As shown in FIG. 2A, when panning of the imaging unit 111 is rotated from a panning angle A to a panning angle B through panning control, and then as shown in FIG. 2B when tilting of the imaging unit 111 is rotated from a tilting angle D to C through tilting control, final imaging angle of the lens as shown in FIG. 2C is the same as an original imaging angle of the lens as shown in FIG. 2A. As shown in FIGS. 2A-2C, a state in which the imaging angle of the lens is the same but the position of the lens is reversed around the axis of rotation may be referred to as a flip. For example, if, before flip, a panning angle is 30 degrees and a tilting angle is 30 degrees, then after the flip, the panning angle may be 210 degrees and the tilting angle may be 150 degrees. According to the panning angle and the tilting angle, the object at the same position may be imaged before and after the flip. At this time, the image may be reversed around the rotation axis, but may be processed to recognize the same position by reversing the image. However, when the rotation axis, which is a structural characteristic of the imaging unit 111, and the center of the lens do not match, the positions of the lenses are not the same and a difference occurs, as in FIGS. 2A-2C and 3. The difference may be for example twice a distance between the rotation axis of the imaging unit and the center of the lens due to the structure of the imaging unit. FIGS. 2A-2C and 3 show a case in which the position of the lens is vertically reversed. However, in all cases where the position of the lens is reversed around the rotation axis, a difference may occur in the position of the lens.

Figure 3:
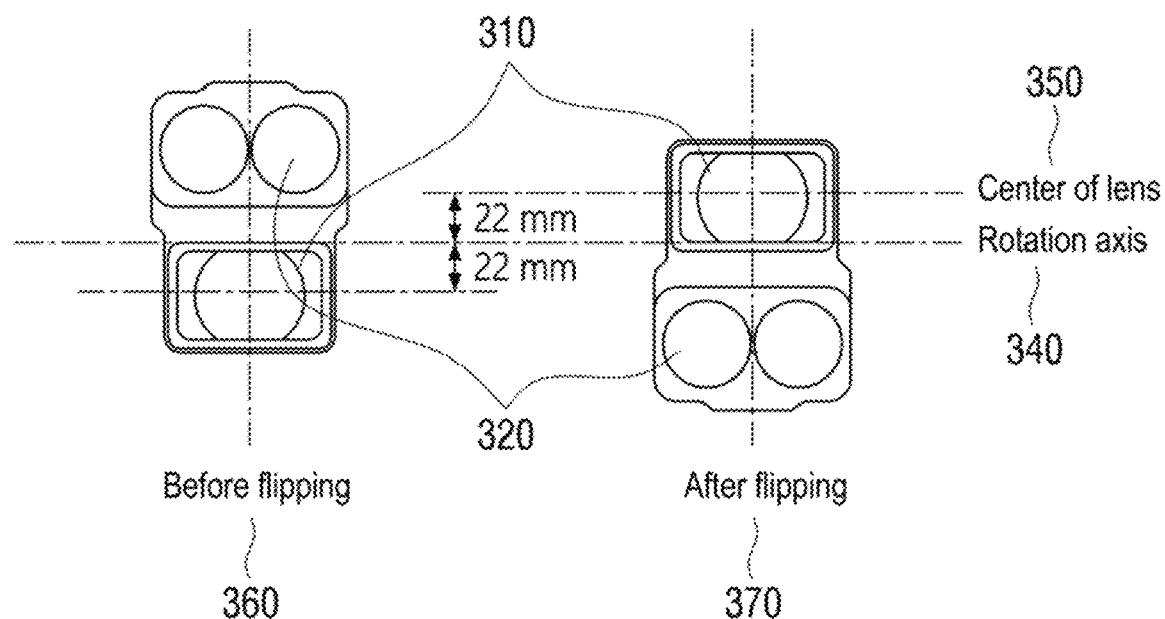
Figure 4:

For example, as illustrated in FIG. 4, the imaging position of the camera lens changes after the flip based on the length that the lens is decentered from the rotation center. For example, as shown in FIGS. 3 and 4, if a center 350 of a lens 310 is decentered from the rotation axis 340 by for example 22 mm, then an imaging position 410 of the lens before the flip, which may correspond to position 360, can be moved 44 mm to a new imaging position 420 after the flip, which may correspond to position 370. Accordingly, the privacy masking area also moves to another position according to the decentered length.

Figure 5A:
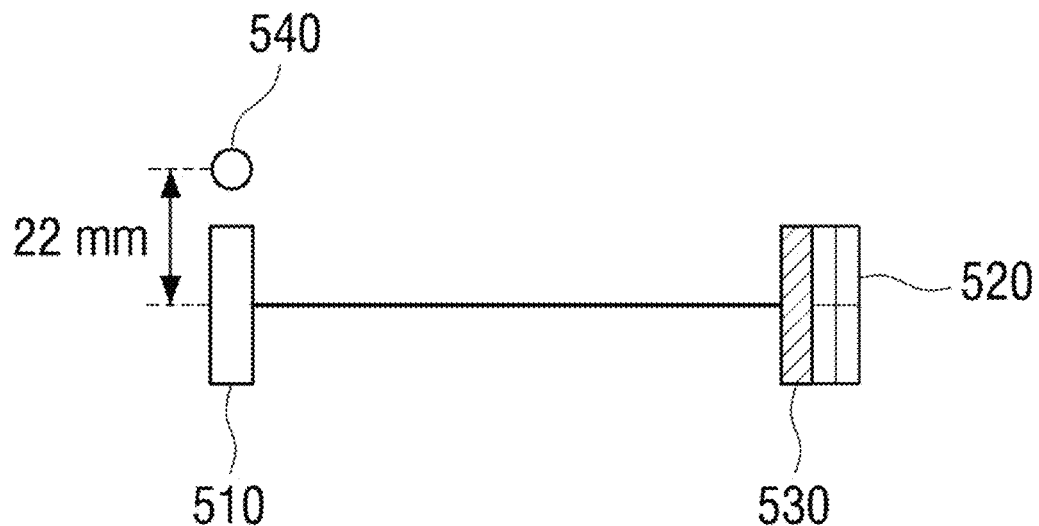
FIGS. 5A, 5B and 6 are diagrams for explaining a process of correcting a mask position in an imaging device according to an embodiment.
Figure 5B:
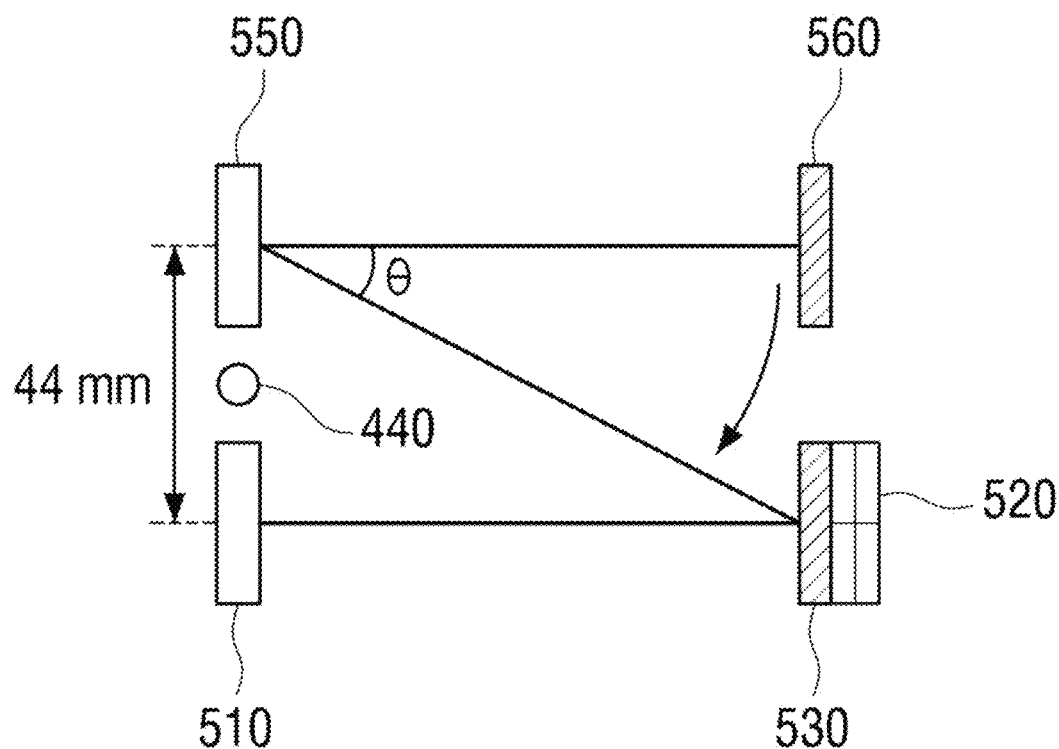

However, the imaging angles before and after the flip are the same. Therefore, when generating a mask from an image after flipping, a mask created and stored before flipping may be used. When creating a mask before flipping, a distance to the object is measured. When creating and storing a mask for the object, the distance to the object is also stored. A mask before flipping stored in this way is used when creating a mask after flipping. Because the rotation axis and the center of the lens do not coincide, there is a difference in the position of the lens before and after flipping. Therefore, as shown in FIGS. 5A and 5B, when a mask created on the object imaged in the image before flipping is applied as it is in the image after flipping, an error occurs between the object and the mask. FIG. 5A shows that a mask is applied at position 530 to an object 520 before flipping. Then, as in FIG. 5B, when the position of the lens moves from a position 510 to a position 550 around the rotation axis 540 through flipping, the mask also moves from the position 530 to the position 560 if there is no position correction. Because the position 560 of the mask cannot mask the object 520 after flipping, the position 560 of the mask must be corrected by θ.

In correcting the position of the mask, the position of the mask created on the object in the image imaged in a second imaging condition is corrected according to a distance to the object measured in a first imaging condition. Here, the first imaging condition may mean an imaging condition in which the lens has the same imaging angle as the second imaging condition, and the position of the lens is reversed from the second imaging condition around the rotation axis. Here, the imaging condition is data including a panning angle and a tilting angle, in which in the first imaging condition and the second imaging condition, the difference in the panning angle is 180 degrees, and the sum of the tilting angles is 180 degrees. In other words, the first imaging condition may mean an imaging condition before flipping, and the second imaging condition may mean an imaging condition after flipping.

In order to accurately correct the position of the mask, an error between the mask created in the second imaging condition and the object may be calculated from the distance between the center point of the lens and the rotation axis and the distance to the object, and the position of the mask may be corrected to the object using the calculated error between the mask and the object.

Figure 6:
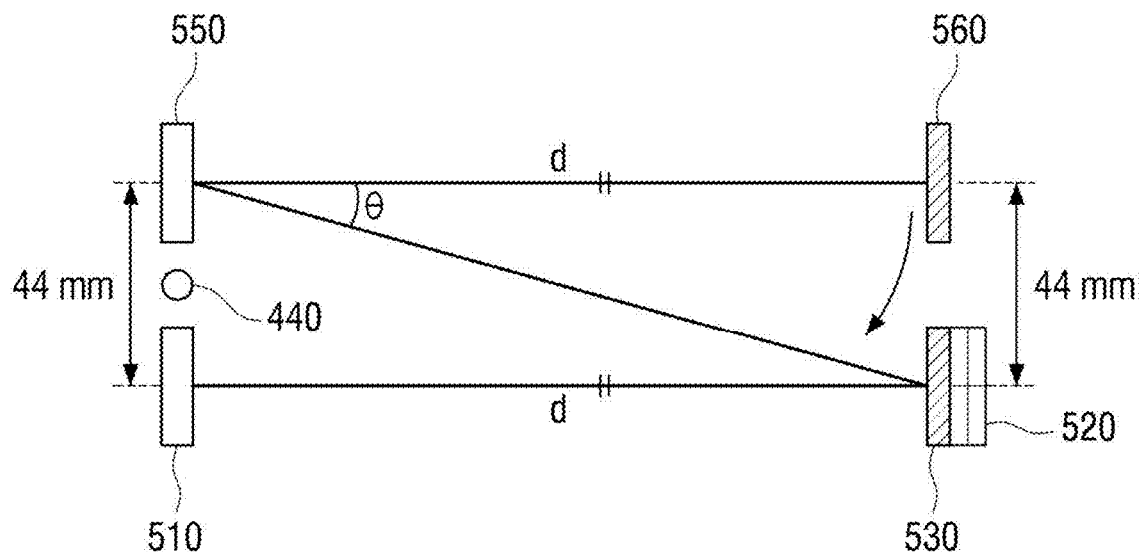

The error between the mask and the object in the second imaging condition, which is the imaging condition after flipping, may be modeled as shown in FIG. 6, and the error may be calculated using this. The distance between the center point of the lens and the rotation axis is a value that is fixed by the structural characteristics of the imaging unit and is a known value. The mask in the second imaging condition uses a mask created and stored in the first imaging condition. Therefore, the position of the mask in the first imaging condition and the position of the mask in the second imaging condition differ by twice the distance between the center point of the lens and the rotation axis in the first imaging condition or the second imaging condition. When a mask is created and stored in the first imaging condition, a distance to the object is also stored. Therefore, the error between the mask created in the second imaging condition and the object may be calculated using the stored distance to the object. The error may be calculated by the following equation.

$$\theta = \tan^{-1}(l/d) \quad \text{[Equation 1]}$$

where θ is the error, l is the distance between the center point of the lens before and after flipping (twice the distance between the center point of the lens and the axis of rotation), and d is the distance between the center point of the lens and the object before flipping. When the distance between the center points of the lens before and after flipping illustrated in FIG. 6 is 44 mm, an error according to the distance between the center point of the lens and the object may be calculated as follows.

TABLE 1

| Distance to object (m) | θ |
|---|---|
| 1.5 | 1.6802 |
| 2.0 | 1.2603 |
| 2.5 | 1.0083 |
| 3.0 | 0.8403 |
| 3.5 | 0.4203 |
| 4.0 | 0.6302 |
| 5.0 | 0.5042 |
| 7.0 | 0.3601 |
| 10 | 0.2521 |
| 20 | 0.1261 |
| 30 | 0.0840 |
| 50 | 0.0504 |
| 70 | 0.0360 |
| 100 | 0.0252 |
| 150 | 0.0168 |
| 200 | 0.0126 |

When the distance to the object stored before flipping is used, the error may be calculated by Equation 1 above. In an embodiment, the error may be calculated by measuring the distance to the object after flipping, not the distance to the object stored before flipping. Here, the distance to the object is different from the distance and a value to the object stored before flipping, and thus may be calculated through the following equation.

$$\theta = \sin^{-1}(l/d') \quad \text{[Equation 2]}$$

where d' is the distance between the center point of the lens and the object after flipping.

The distance to the object may be measured using locus data of the lens. It is possible to estimate the distance of the object (subject) based on position information of a focus lens that is in focus at a zoom position. A zoom lens position, a focus lens position, and the distance of the object have a relationship. Here, in using the locus data, in which the locus data is focus position data of the focus lens according to the zoom lens position and the distance of the object, when it is in focus, the object distance may be estimated through the position of the zoom lens and the position of the focus lens. For example, when a 5 m focus position is 2500 and a 10 m focus position is 3200, and if the focus position is 3000, the estimated distance d=5+(5*500/700)=8.5 m may be calculated. A high magnification has higher resolution compared to a low magnification.

In addition, in order to measure the distance to the object, a distance measurement unit 115 for measuring the distance to the object may be further included. At this time, Laser Range Finder (LRF) or Radar may be used. The LRF may use a Time of Flight (TOF) method and a phase-shift method. The TOF scheme is a scheme of calculating a distance using a difference between a time when light is emitted from the distance measurement unit and a time when light is returned from the object to the distance measurement unit. In the phase-shift scheme, light having a constant frequency is irradiated onto an object, and a distance is calculated by a phase difference between a reference light and light reflected from the object and returned to the distance measurement unit. In the case of the radar, a frequency modulated continuous wave may be transmitted through an FMCW scheme, which is a frequency modulated continuous wave radar, and a distance and a speed may be estimated through a degree of change of a received frequency. The radar makes it easy to estimate a distance of a moving subject with speed (when there is no speed, it is determined by clutter), and the LRF makes it easy to measure a distance to a desired point. It may be desirable to perform distance measurement using the LRF.

When the distance to the object is measured using the locus data of the lens, a separate device for distance measurement may be omitted, which may keep cost low. However, compared to a distance measurement unit such as an LRF, the accuracy of an object distance may be inferior. The distance measurement unit 115 may be accurate in measuring a distance, but may have a disadvantage if it is expensive.

In an embodiment order to more accurately apply and correct a position of a mask area, a structural error of an imaging device may be corrected and initialized. The error discussed above may be an error that occurs because a center point of a lens does not coincide with a rotation axis, and the structural error may occur due to assembly tolerances or tension of a rotating motor. Therefore, by correcting this, the position of the mask may be accurately applied and corrected. A process of initializing by correcting the structural error of the imaging device may be performed after the imaging device is manufactured or installed in a position to be operated. Also, because the error may change or increase over time, it may be performed periodically.

In an embodiment, in order to compensate for a structural error that may occur during panning, a panning motor is rotated from 0 degrees to 180 degrees, for example at unit angle intervals. Then, an actual rotation angle of the imaging unit is measured. Next, a rotation angle of the panning motor and the actual rotation angle of the imaging unit may be compared and stored in the memory. Assembly tolerance occurs due to assembly gap between a pan rotation shaft and a pan gear and a gap of a rotation shaft due part dispersion. In the case of the assembly tolerance, there may be slight differences for each sample. In addition, an error may occur due to a tension of a belt for rotating the panning motor. In order to correct the position of the mask using the structural error, while rotating the panning motor from 0 to 180 degrees, the rotation angle of the panning motor and the actual rotation angle of the imaging unit are compared. Two values are compared and stored in a buffer or the like by rotating between 0 degrees and 180 degrees, for example at unit angle intervals. After that, if the value is reflected when flipped, the mask position may be accurately corrected. The panning rotates from 0 to 360 degrees without limitation, but a rotation angle from 180 to 360 degrees is symmetrical with a rotation angle from 0 to 180 degrees. Therefore, information stored by comparing the rotation angle of the panning motor and the actual rotation angle of the imaging unit is applied to the actual rotation angle of the imaging unit at 180 to 360 degrees of the panning motor.

In an embodiment, imaging device 110 may further include a rotation angle measurement unit 116 for measuring the actual rotation angle of the imaging unit. The rotation angle measurement unit 116 may be configured with one or more of a gyro sensor or an acceleration sensor. The rotation angle measurement unit 116 may be used to measure a tilting angle as well as a panning angle.

In an embodiment, the gyro sensor measures a physical quantity for 3 axes of angular velocity, in which when it is stationary, the angular velocity is 0, when there is motion, the angular velocity occurs, and when the angular velocity is integrated, a rotation angle may be measured. Because an error is also integrated as time passes, there may be a disadvantage that the error may increase. The acceleration sensor measures a physical quantity for 3 axes of acceleration, in which when it is stationary, 9.8 (m/s$^2$) occurs with respect to a direction of gravity, and when it is stationary, it is possible to estimate how inclined to the direction of gravity through gravity acceleration. A rotation angle may be measured through the gyro sensor and the acceleration sensor. However, an error increases over time. Therefore, when returning to an initial state, a drift phenomenon, which is a phenomenon that is tilted in one direction compared to an original state, may occur. For such a gyro sensor, the acceleration sensor may be used as a complementary filter to compensate for the phenomenon. At this time, the rotation angle may be calculated using the following equation.

$$\theta_x^t = a \times (\theta_x^{t-1} \times dt) + b \times Acce_{angle}, (a, b \Rightarrow \text{design parameter})$$

$$Acce_{angle} = \tan^{-1}(a_x/a_z), \text{ a unit for angle needs to be considered (radian, degree)} \quad [\text{Equation 3}]$$

In an embodiment order to correct a structural error that may occur during tilting, a tilting angle of 0 degrees is initialized to a predetermined position. Then, a tilting error angle is calculated using a position of a lens at a first tilting angle and a position of a lens at a second tilting angle. Then, the position of the initialized tilting angle of 0 degrees is rotated by half of the tilting error angle to correct the position of the tilting angle of 0 degrees. In this case, the second tilting angle may have the same imaging angle of the lens as the first tilting angle, but the position of the lens may be a tilting angle reversed from the first tilting angle around the rotation axis.

Figure 7:
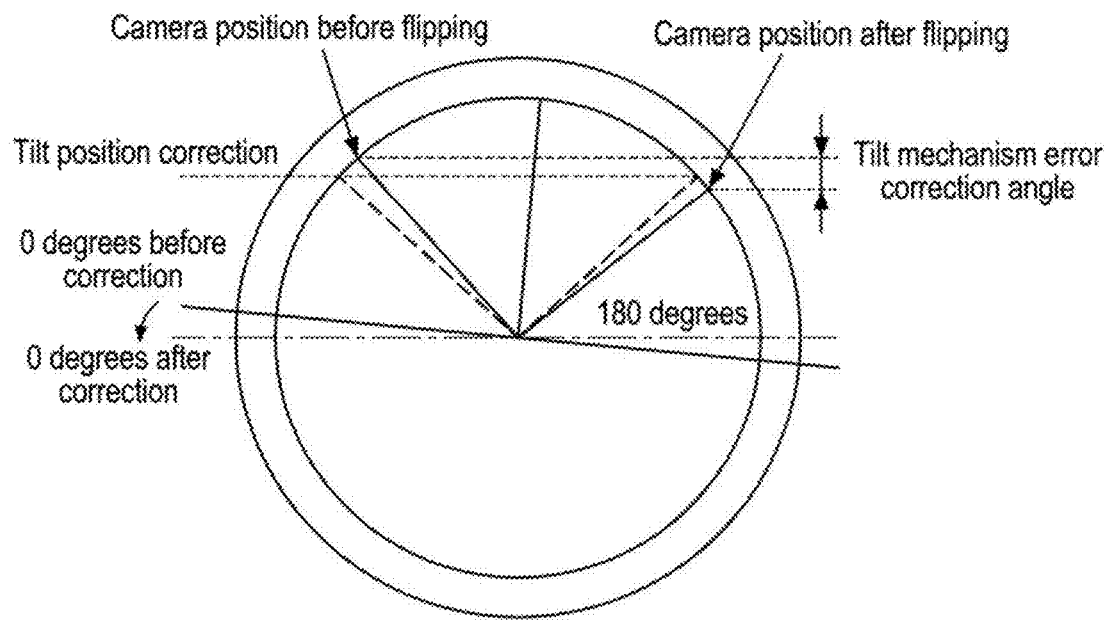
FIG. 7 is a diagram for explaining a process of initializing by correcting structural errors of an imaging device in the imaging device according to an embodiment.

In an embodiment, 0 degrees of the tilting angle is initialized by setting the predetermined position to the position of the tilting angle of 0 degrees. However, the correct tilt angle may not be 0 degrees. Therefore, in order to calculate and apply the position of the correct tilting angle of 0 degrees, a flip function may be used. The tilting error angle is calculated using the position of the lens at the first tilting angle and the position of the lens at the flipped second tilting angle based on a tilting angle of 0 degrees initialized to a predetermined position. The position of the initialized tilting angle of 0 degrees may be rotated by half of the tilting error angle to correct the position of the tilting angle of 0 degrees. At the initialized 0 degrees before correcting, the position of the lens before flipping and the position of the lens after flipping may differ as shown in FIG. 7. The tilting error angle is calculated according to the position of the lens before flipping and the position of the lens after flipping. The position of the initialized tilting angle of 0 degrees is rotated by half of the tilting error angle to correct the position of the tilting angle of 0 degrees. If the tilting angle before correcting is rotated by half of the tilting error angle according to the position of the lens before flipping and the position of the lens after flipping, the position of the lens before flipping is also rotated and the position of the lens after flipping is also rotated, thereby enabling to eliminate the tilt angle error of the position of the lens before and after flipping.

Figure 8:
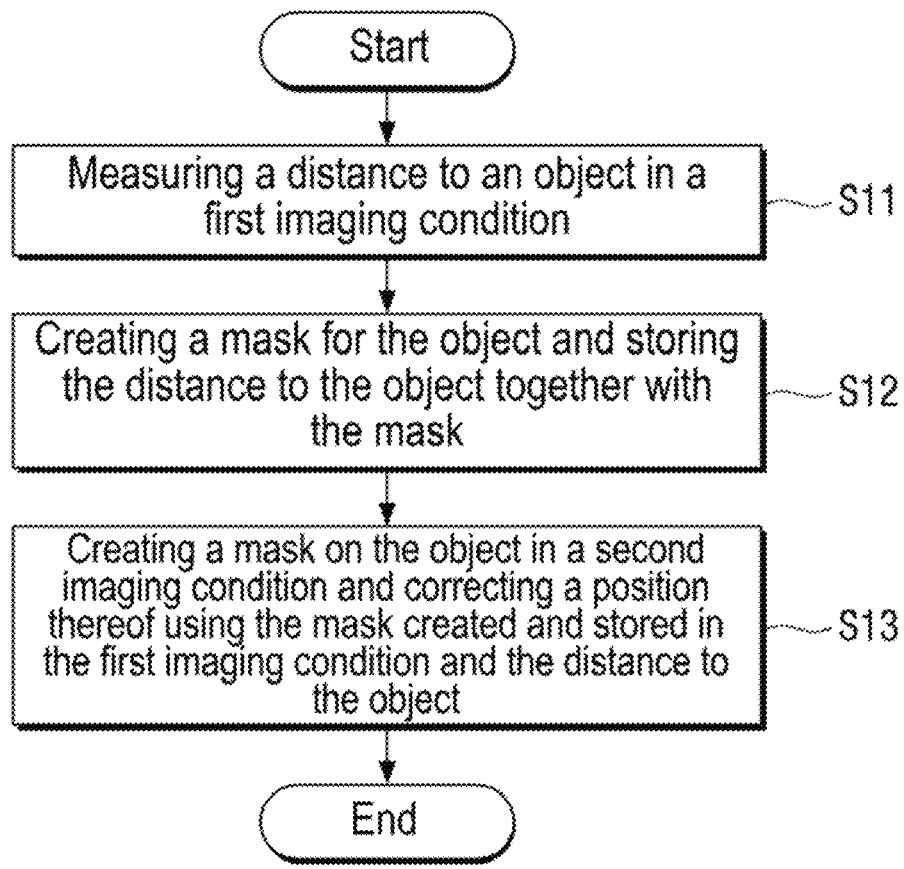
FIG. 8 is a flowchart of a method for correcting a mask position according to an embodiment.

FIG. 8 is a flowchart of a method for correcting a mask position according to an embodiment, and FIGS. 9 to 12 are flowcharts of a method for correcting a mask position according to an embodiment. A detailed description of a method for correcting a mask position according to an embodiment corresponds to the description of the imaging device 110 of FIGS. 1 to 7. Therefore, hereinafter, only functions of each component will be outlined to avoid redundant description.

The method for correcting the mask position according to the embodiment relates to a method in which panning or tilting is performed, and a position of a privacy mask in an image imaged by an imaging device in which a rotation axis of an imaging unit and a center of a lens do not match is corrected.

In step S11, a distance to an object in a first imaging condition is measured. In step S12, a mask for the object is created, and the distance to the object is stored together with the mask. In embodiments, the distance to the object may be measured using a distance measurement unit or using locus data of a lens.

Thereafter, if a flip function is performed, in step S13, a mask is created for the object in a second imaging condition and a position thereof is corrected using the mask created and stored in the first imaging condition and the distance to the object. In an embodiment, the imaging condition is information including a panning angle and a tilting angle. The first imaging condition is an imaging condition in which the lens has the same imaging angle as the second imaging condition, but the position of the lens is reversed from the second imaging condition around the rotation axis. The first imaging condition and the second imaging condition may have a difference in panning angle of 180 degrees and a sum of tilting angles of 180 degrees.

Figure 9:
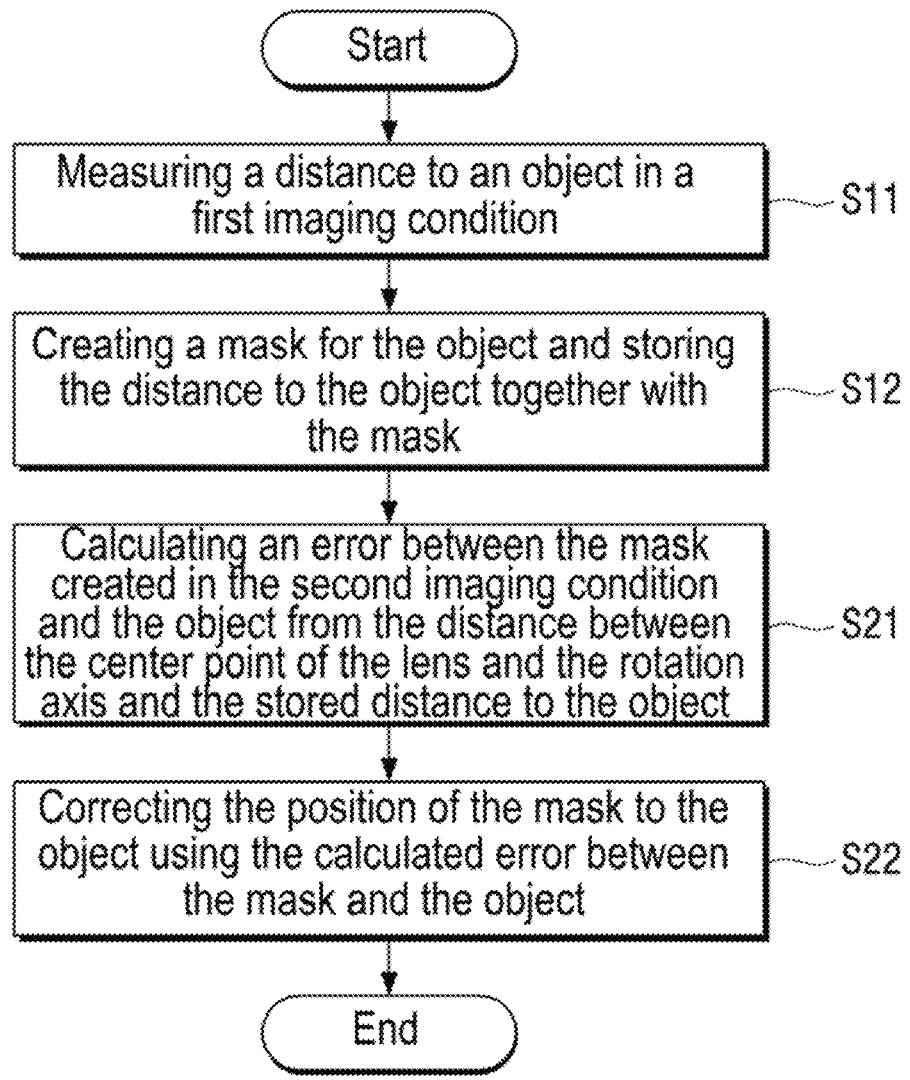
FIGS. 9 to 12 are flowcharts of a method for correcting a mask position according to an embodiment.

In an embodiment, step S13 may be performed through steps S21 to S22, as shown in FIG. 9. In step S21, an error between the mask created in the second imaging condition and the object is calculated from the distance between the center point of the lens and the rotation axis and the stored distance to the object. In step S22, the position of the mask is corrected to the object using the calculated error between the mask and the object.

Figure 10:
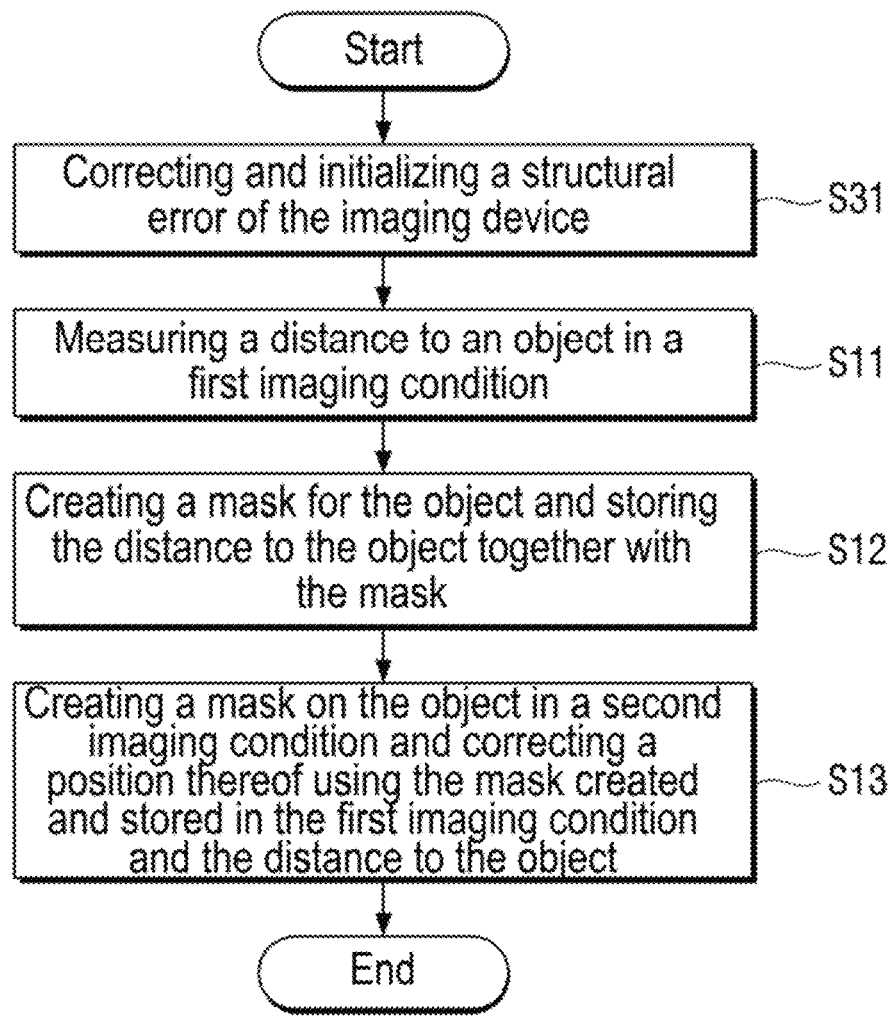

In an embodiment step S31 may be performed prior to to step S11, as shown in FIG. 10. After assembling or initializing the imaging device, in step S31 a structural error of the imaging device may be corrected and initialized.

Figure 11:
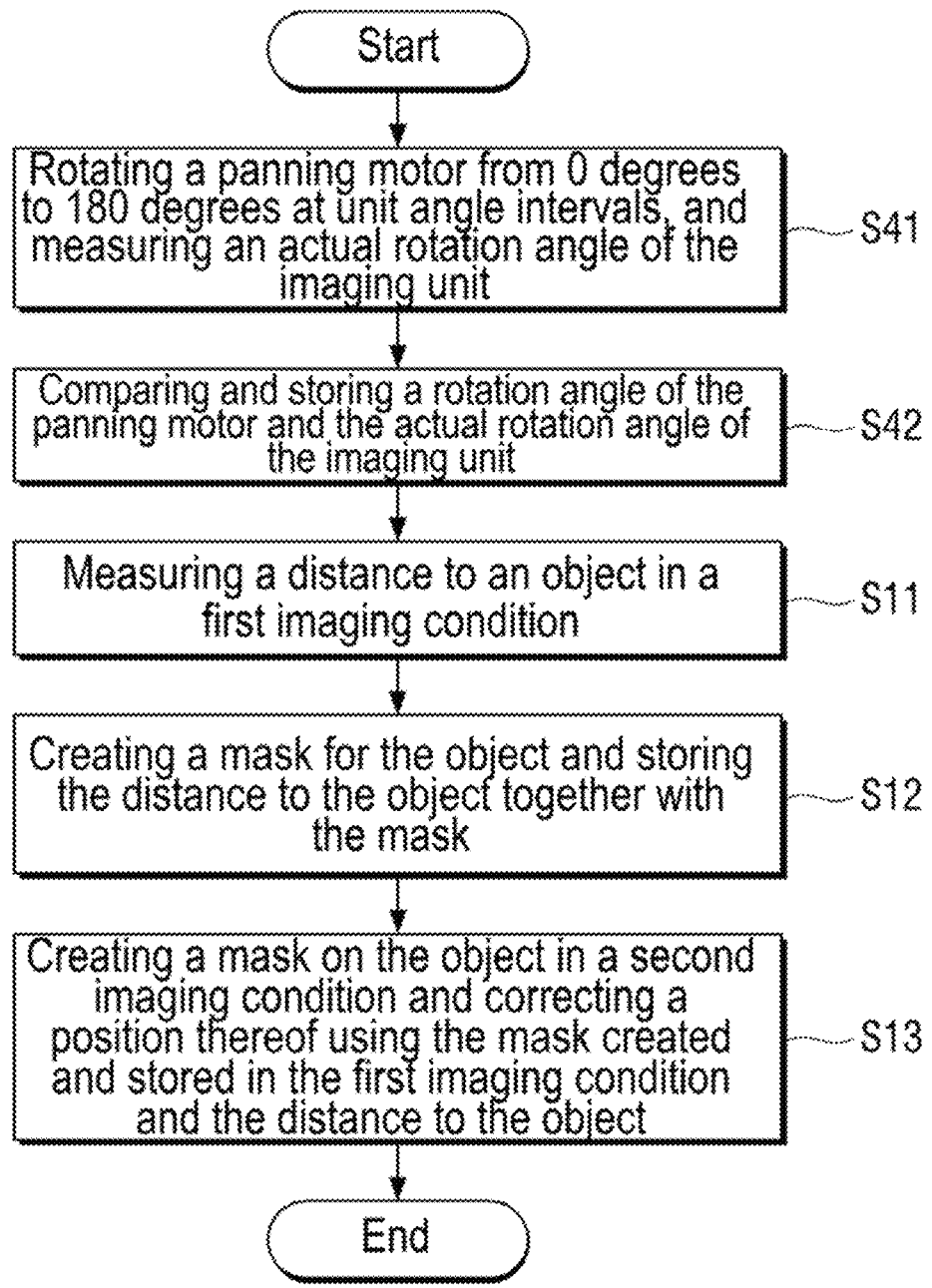

In an embodiment, step S31 may be performed through steps S41 to S42, as shown in FIG. 11. In step S41, a panning motor is rotated from 0 degrees to 180 degrees at unit angle intervals, and an actual rotation angle of the imaging unit is measured. In step S42, a rotation angle of the panning motor and the actual rotation angle of the imaging unit may be compared and stored. The actual rotation angle of the imaging unit may be measured using one or more of a gyro sensor or an acceleration sensor. Information stored by comparing the rotation angle of the panning motor and the actual rotation angle of the imaging unit may be applied to the actual rotation angle of the imaging unit at 180 to 360 degrees of the panning motor.

In step S13, the position of the mask may be corrected using the difference between the rotation angle of the panning motor and the actual rotation angle of the imaging unit stored in step S42.

Figure 12:
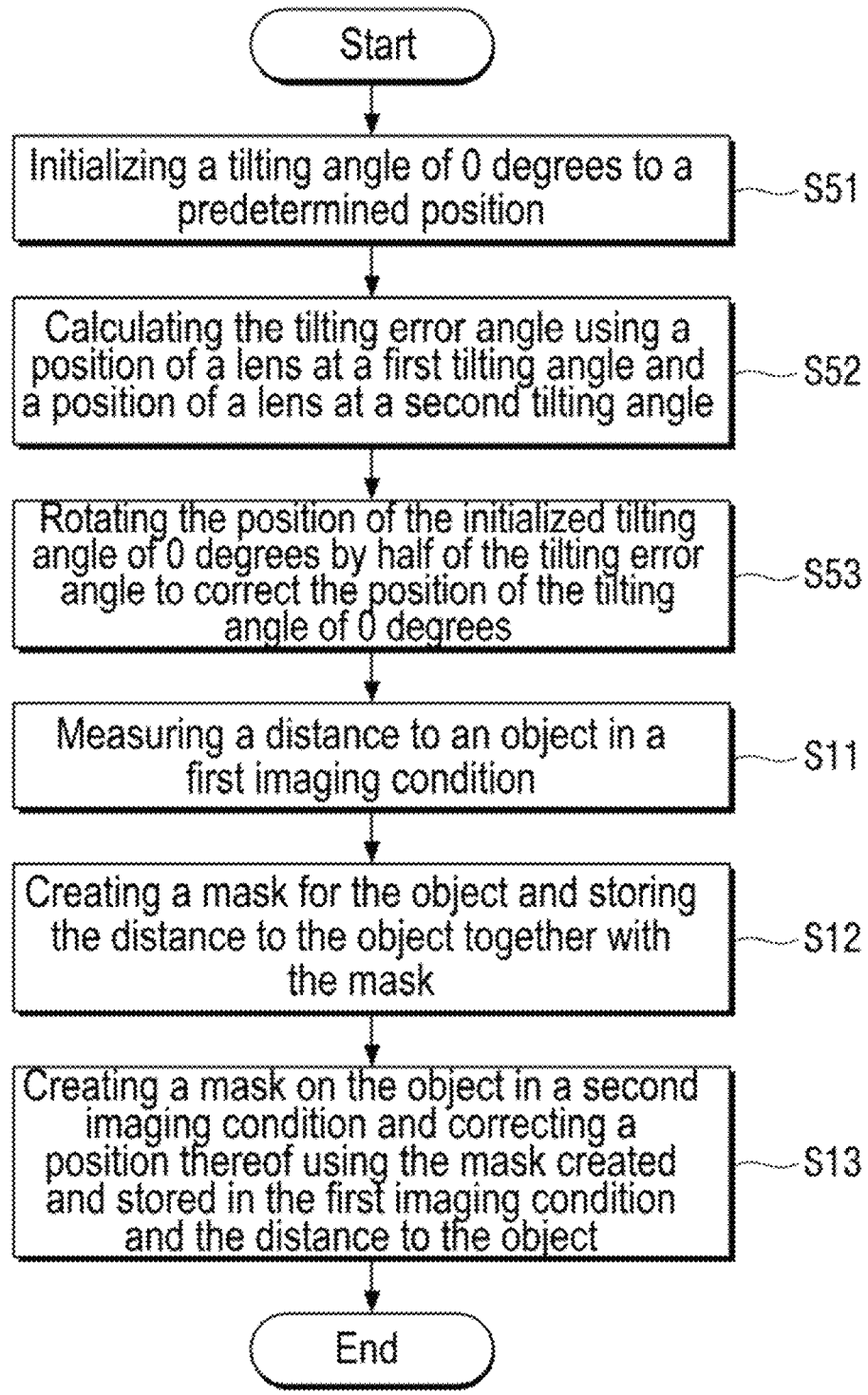

In addition, in an embodiment step S31 may be performed through steps S51 to S53, as shown in FIG. 12. In step S51, a tilting angle of 0 degrees is initialized to a predetermined position. In step S52, the tilting error angle is calculated using a position of a lens at a first tilting angle and a position of a lens at a second tilting angle. In step S53, the position of the initialized tilting angle of 0 degrees is rotated by half of the tilting error angle to correct the position of the tilting angle of 0 degrees. The second tilting angle may have the same imaging angle of the lens as the first tilting angle, but the position of the lens may be a tilting angle reversed from the first tilting angle around the rotation axis.

Each component described above with reference to FIG. 1 may be implemented as a software component, such as a task performed in a predetermined region of a memory, a class, a subroutine, a process, an object, an execution thread or a program, or a hardware component, such as a Field Programmable Gate Array (FPGA) or Application Specific Integrated Circuit (ASIC). In addition, the components may be composed of a combination of the software and hardware components. The components may be reside on a computer readable storage medium or may be distributed over a plurality of computers.

And each block may represent a module, segment, or portion of code, which comprises one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

What is claimed is:

1. A method of creating a privacy mask from an image imaged by an imaging device in which a rotation axis of a camera and a center of a lens do not match, the method comprising:

imaging an object in a first imaging condition;
   creating a first mask for the object and storing a position of the first mask in the image and a distance from the camera to the object;
   changing an imaging angle of the camera from the first imaging condition to a second imaging condition such that a position of the lens in the second imaging condition is reversed around the rotation axis from a position of the lens in the first imaging condition after at least a panning motion and a tilting motion of the camera; and
   creating a second mask for the object in the second imaging condition and correcting a position of the second mask in the image using the first mask,
   wherein the correcting the position of the second mask using the first mask includes correcting the position of the second mask based on the position of the first mask, the distance from the camera to the object, and the distance between the rotation axis of the camera and the center of the lens.

2. The method of claim 1, further comprising:
   calculating an error between the second mask created and the object based on an offset between a center point of the lens and the rotation axis and the distance from the camera to the object; and
   correcting the position of the second mask using the calculated error.

3. The method of claim 2, wherein the distance is measured using locus data of the lens.

4. The method of claim 1, further comprising initializing the imaging device by correcting a structural error of the imaging device.

5. The method of claim 4, wherein the correcting of the structural error comprises:

rotating a panning motor from 0 degrees to 180 degrees at unit angle intervals;
measuring an actual rotation angle of the camera; and
comparing and storing a rotation angle of the panning motor and the actual rotation angle of the camera.

6. The method of claim 5, wherein the actual rotation angle of the camera is measured using one or more of a gyro sensor or an acceleration sensor.

7. The method of claim 5, wherein information stored by comparing the rotation angle of the panning motor and the actual rotation angle of the camera is applied to the actual rotation angle of the camera at 180 to 360 degrees of the panning motor.

8. The method of claim 5, wherein the correcting of the second mask comprises correcting the position of the second mask using a difference between the rotation angle of the panning motor and the actual rotation angle of the camera.

9. The method of claim 4, wherein the correcting of the structural error comprises:
   setting a position of a tilting angle of 0 degrees to a predetermined position;
   calculating a tilting error angle using a lens position of the lens at a first tilting angle and a lens position of the lens at a second tilting angle; and
   rotating the position of the tilting angle of 0 degrees by half of the tilting error angle to correct the position of the tilting angle of 0 degrees,
   wherein an imaging angle of the camera for the second tilting angle is same as an imaging angle of the camera for the first tilting angle, and
   wherein the position of the lens at the second tilting angle is reversed around the rotation axis from the position of the lens at the first tilting angle.

10. The method of claim 2, wherein the error is calculated based on a following equation:

$$\theta = \tan^{-1}(l/d),$$

wherein $\theta$ represents the error, d represents the distance from the camera to the object, and l represents the twice the distance between the rotation axis of the camera and the center of the lens.

11. An imaging device, comprising:
    a camera configured to support panning and/or tilting motions, wherein a rotation axis of the camera and a center of a lens of the camera do not match;
    a memory configured to store instructions for creating a privacy mask in an image imaged by the camera; and
    at least one processor configured to execute the instructions to:
    imaging an object in a first imaging condition;
    create a first mask for the object in the first imaging condition and store a position of the first mask in the image and a distance from the camera to the object;
    changing an imaging angle of the camera from the first imaging condition to a second imaging condition such that a position of the lens in the second imaging condition is reversed around the rotation axis from a position of the lens in the first imaging condition after at least a panning motion and a tilting motion of the camera;
    create a second mask for the object in the second imaging condition; and
    correct a position of the second mask based on the position of the first mask, the distance from the camera to the object, and the distance between the rotation axis of the camera and the center of the lens.

12. The device of claim 11, wherein the at least one processor is further configured to execute the instructions to:
calculate an error between the second mask and the object based on an offset between a center point of the lens and the rotation axis and the distance from the camera to the object, and
correct the position of the second mask using the calculated error.

13. The device of claim 12, wherein the at least one processor is further configured to execute the instructions to measure the distance using locus data of the lens.

14. The device of claim 11, wherein the at least one processor is further configured to execute the instructions to initialize the imaging device by correcting a structural error of the imaging device.

15. The device of claim 14, wherein the at least one processor is further configured to execute the instructions to:
rotate a panning motor from 0 degrees to 180 degrees at unit angle intervals,
measure an actual rotation angle of the camera, and
compare a rotation angle of the panning motor and the actual rotation angle of the camera; and
store the rotation angle of the panning motor and the actual rotation angle of the camera in the memory.

16. The device of claim 15, further comprising:
one or more of a gyro sensor or an acceleration sensor configured to measure the actual rotation angle of the camera.

17. The device of claim 16, wherein the at least one processor is further configured to execute the instructions to:
set a position of a tilting angle of 0 degrees to a predetermined position,
calculate a tilting error angle using a lens position of the lens at a first tilting angle and a lens position of the lens at a second tilting angle, and
rotate the position of the tilting angle of 0 degrees by half of the tilting error angle to correct the position of the tilting angle of 0 degrees,
wherein an imaging angle of the camera for the second tilting angle is same as an imaging angle of the camera for the first tilting angle, and
wherein a position of the lens at the second tilting angle is reversed around the rotation axis from a position of the lens at the first tilting angle.

* * * * *